United States Patent
Bergeron (10) Patent No.: US 9,537,785 B2
(45) Date of Patent: Jan. 3, 2017

(54) LINK AGGREGATION GROUP (LAG) LINK ALLOCATION

(71) Applicant: Ixia, Calabasas, CA (US)

(72) Inventor: Matthew R. Bergeron, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 159 days.

(21) Appl. No.: 14/460,340

(22) Filed: Aug. 14, 2014

(65) Prior Publication Data

US 2016/0050156 A1 Feb. 18, 2016

(51) Int. Cl.
*H04L 12/891* (2013.01)
*H04L 12/709* (2013.01)

(52) U.S. Cl.
CPC ............. *H04L 47/41* (2013.01); *H04L 45/245* (2013.01)

(58) Field of Classification Search
None
See application file for complete search history.

(56) References Cited

U.S. PATENT DOCUMENTS

| | | | | |
|---|---|---|---|---|
| 2007/0195795 A1* | 8/2007 | Arai | ................... | H04L 12/2856 370/396 |
| 2008/0291826 A1* | 11/2008 | Licardie | ................. | H04L 47/10 370/230 |
| 2015/0023147 A1* | 1/2015 | Lee | ......................... | H04L 45/38 370/216 |
| 2015/0156127 A1* | 6/2015 | Bello | .................... | H04L 47/125 370/235 |

OTHER PUBLICATIONS

Krishnan, "Flow-aware Real-time SDN Analytics (FRSA)," http://blog.sflow.com/2014/02/flow-aware-real-time-sdn-analytics-frsa.html, pp. 1-12 (Feb. 5, 2014).

* cited by examiner

*Primary Examiner* — Christine Duong
(74) *Attorney, Agent, or Firm* — Jenkins, Wilson, Taylor & Hunt, P.A.

(57) ABSTRACT

Methods, systems, and computer readable media for link aggregation group (LAG) link allocation are disclosed. According to one method for indirect LAG link allocation, the method includes status information associated with a LAG. The method also includes at a first network node, utilizing the status information to set path identifiers in packets for controlling LAG allocation. The method further includes at a second network node separate from the first network node, receiving the packets and allocating LAG links to the packets based on the path identifiers.

17 Claims, 5 Drawing Sheets

| ASSIGNMENT VALUE(S) | VLAN ID | RELATED UTILIZATION |
|---|---|---|
| 0-1 | 1 | 80% |
| 2-6 | 2 | 50% |
| 7-12 | 3 | 30% |
| 13-15 | 4 | 70% |

FIG. 3

LINK AGGREGATION GROUP (LAG) LINK ALLOCATION

TECHNICAL FIELD

The subject matter described herein relates to processing information. More specifically, the subject matter relates to methods, systems, and computer readable media for link aggregation group (LAG) link allocation.

BACKGROUND

Link aggregation generally refers to any technique that aggregates or combines multiple network connections (e.g., links or ports) into one virtual network connection or a link aggregation group (LAG). For example, at concurrent times, a network switch may provide data to a server via two LAG links associated with a LAG, where the combined throughput of the LAG links is greater than either of the individual LAG links. When sending packets via a LAG, a network element, such as a network switch, may be configured to provide the packets via one or more LAG links. However, issues arise when attempting to use or allocate the LAG efficiently. In particular, conventional LAG link allocation is typically based on a flow tuple hash or other methods that fail to effectively load balance or load share flows (e.g., sessions or related packets) among LAG links. For example, conventional LAG link allocation techniques fail to ensure that LAG links are not overutilized or underutilized. Another problem with conventional LAG implementations is that conventional LAG implementations typically require all links in a LAG be the same speed and have other similar characteristics, such as latency.

Accordingly, a need exists for improved methods, systems, and computer readable media for LAG link allocation.

SUMMARY

Methods, systems, and computer readable media for link aggregation group (LAG) link allocation are disclosed. According to one method for indirect LAG link allocation, the method includes status information associated with a LAG. The method also includes at a first network node, utilizing the status information to set path identifiers in packets for controlling LAG allocation. The method further includes at a second network node separate from the first network node, receiving the packets and allocating LAG links to the packets based on the path identifiers.

According to one system, the system includes a LAG controller configured to monitor status information associated with a LAG. The system also includes a first network node configured to utilize the status information to set path identifiers in packets for controlling LAG allocation and a second network node separate from the first network node. The second network node is configured to receive the packets and to allocate LAG links to the packets based on the path identifiers.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the term "link" refers to any path, route, or type(s) of connection between devices. For example, a link may include one or more communications nodes, networks, or media, such as a wire, cable, fiber optics, radio, or other medium. In a second example, a link may also include a trunk and/or logical connection.

As used herein, the term "link aggregation group (LAG)" refers to a group of links, a related link aggregation technique, and/or a multi-path technique for connecting multiple devices. For example, a LAG may involve an equal-cost multi-path routing technique or other multi-path technology for providing communications between two or more network nodes. In this example, the two or more network nodes may be associated with different data centers, networks, and/or multiple network operators interconnecting them.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for link aggregation group (LAG) link allocation. Conventional LAG link allocation techniques use hashing functions that generate hash values based on packet header information, e.g., a source address, a destination address, a source port number, a destination port number, and/or an application protocol. For example, every packet in a flow may include packet header information that outputs to the same hash value. In this example, the hash value may be associated with a particular LAG link. While packets of a given flow may be related to the same hash value, other packets may also include packet header information that when used by a hashing function generates the same hash value and, therefore, multiple flows may be associated with the same link. Hence, conventional LAG link allocation techniques that use hashing functions do not prevent LAG links from being overutilized or underutilized.

In accordance with some aspects of the subject matter described herein, a computing platform (e.g., a device or a node) or a module (e.g., a field-programmable gateway array (FPGA), an application-specific integrated circuit (ASIC), or software executing on a processor) may be configured to use status information associated with a LAG for assigning path identifiers that affect LAG link allocation. For example, a network element (e.g., a network switch, a network router, or an endpoint) may receive status information associated with a LAG (e.g., link utilization information, error rate information, and/or maintenance or projected maintenance information) from a LAG controller or other entity, such as a software defined network (SDN) controller or a network management system. In this example, the network element may modify, using the status information, values (e.g., in a load balancing hash table) that determines path identifiers to include in packets, where each of the path identifiers (e.g., virtual local area network (VLAN) identifier or a multiprotocol label switching (MPLS) label) indicates a particular LAG link for sending a corresponding packet.

By using status information associated with a LAG to assign path identifiers that affect or trigger LAG link allocation, an exemplary computing platform or module may use current utilization rates of individual LAG links to effectively load balance (e.g., load share) packets among LAG links. Moreover, by using path identifiers stored in packets for triggering LAG link allocation, load balancing mechanisms or related lookup information at a network element associated with a LAG (e.g., a network switch connected to LAG links) can be simplified, e.g., the associations between path identifiers and LAG links may be substantially static and/or have a one to one ratio.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
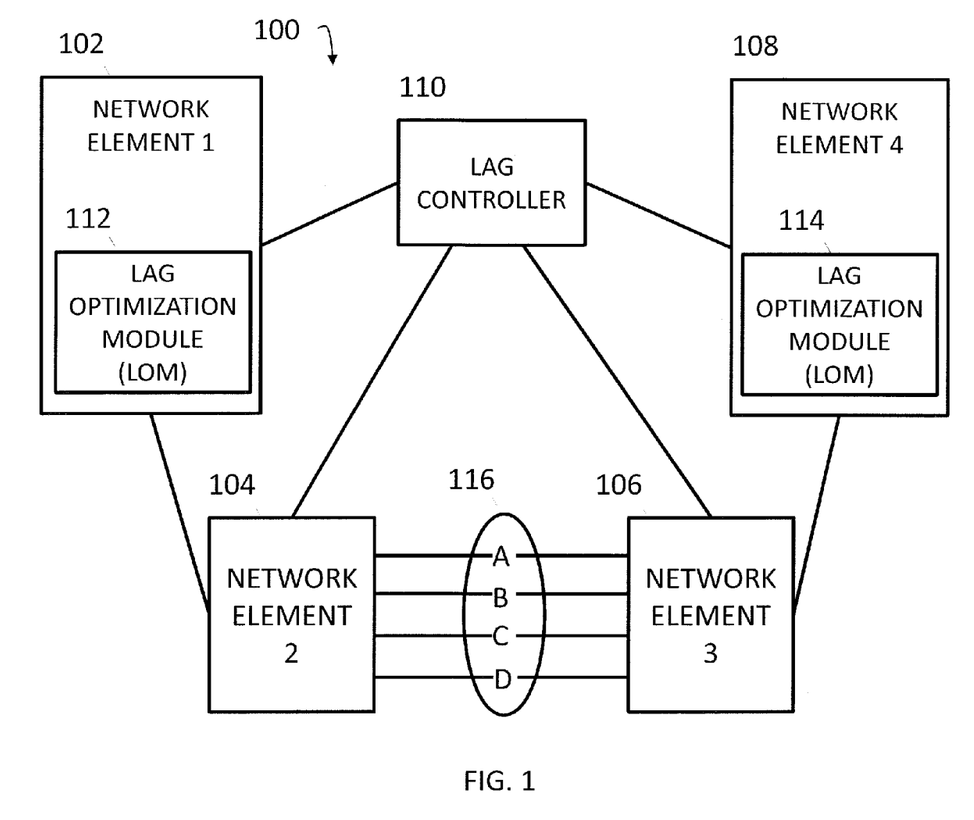
FIG. 1 is a diagram illustrating an exemplary network for LAG link allocation according to an embodiment of the subject matter described herein.

FIG. 1 is a diagram illustrating an exemplary network 100 for LAG link allocation according to an embodiment of the subject matter described herein. Network 100 may represent any suitable entity or entities (e.g., one or more nodes or devices) associated with sending and/or receiving traffic (e.g., one or more packets). For example, network 100 may include an access network, a core network, the Internet, and/or other networks. As depicted in FIG. 1, network 100 may include network elements 102-108, a LAG controller 110, and a LAG 116.

Network elements 102-108 may represent any suitable entity or entities (e.g., one or more nodes or devices) for receiving, processing, and/or sending traffic. Network elements 102-108 may include multiple communications interfaces and may communicate using a variety of protocols. For example, network elements 102-108 may include functionality for communicating or facilitating communications with one or more nodes or modules in network 100.

In some embodiments, network elements 102-108 may include a network switch, a network router, a network device, LAG controller 110, an endpoint, and/or a server. Exemplary communications interfaces may include a software defined network (SDN) related interface, an Internet protocol (IP) interface, a graphical user interface (GUI), a command line interface (CLI), and/or an application programming interface (API). Exemplary protocols may include an extensible markup language (XML) protocol, a hypertext transfer protocol (HTTP), an IP protocol, a Diameter protocol, an OpenFlow protocol, and/or other protocols.

In some embodiments, network elements 102 and 108 may represent endpoints (e.g., computing platforms, devices, and/or nodes) or routers (e.g., near endpoints) associated with one or more flows (e.g., one or more related packets). For example, network element 102 may be a server executing a hypervisor and one or more virtual machines (VM). In this example, the hypervisor and/or VMs may be configured to generate and/or modify packets and/or related header information associated with one or more flows. In another example, network element 108 may be a top of rack server associated with a server or endpoint. In this example, network element 108 may be configured to modify packets and/or related header information associated with one or more flows.

In some embodiments, network elements 102 and 108 may include routing or path related information stored in one or more data structures. Exemplary data structures for storing routing or path related information may include a hash table, an associative array, and/or a content-addressable memory (CAM).

In some embodiments, routing information may include a path assignment table, where each entry in the path assignment table may include an association between one or more assignment values and a path identifier (e.g., VLAN identifier, a MPLS label, or a path label) that affects which LAG link a packet traverses. Exemplary assignment values may include a flow tuple or other identifier, a hash of a flow tuple or other identifier, and/or data in a key-value data structure. For example, an assignment value may represent a value (e.g., a memory address) in a key-value data structure (e.g., a CAM) and a flow tuple or other identifier may represent a key in the key-value data structure. In another example, an assignment value may represent a unique or non-unique key in a key-value data structure and a path identifier may represent a value in the key-value data structure.

In some embodiments, assignment values may represent values within a given range (e.g., 0-15) and may be generated using one or more assignment procedures, such as a hashing function, a load sharing algorithm, a modulus operation, and/or packet header information. Using a path assignment table or related information, network elements 102 and 108 may modify packets to include path identifiers based on corresponding assignment values. The path identifiers in the packets may be used by one or more network elements (e.g., network element 104) to determine and/or indicate which paths (e.g., LAG links) the packets travel.

In some embodiments, network element 102 and/or network element 108 may include a LAG optimization module (LOM), such as LOM 112 or LOM 114. Each of LOMs 112 and 114 may be any suitable entity or entities (e.g., software executing on a processor, an ASIC, an FPGA, or a combination of software, an ASIC, or an FPGA) for performing one or more aspects associated with optimizing LAG utilization. For example, LOM 112 may receive, from LAG controller 110 or another entity, information regarding link utilization associated with LAG 116. In this example, LOM 112 may use this information for determining whether and/or how to (re)distribute load among LAG links associated with LAG 116.

In some embodiments, each of LOMs 112 and 114 may include functionality for modifying and/or maintaining routing information and/or path related information. For example, LOM 112 may be configured to modify associations between assignment values and path identifiers in a path assignment table. By modifying associations between assignment values and path identifiers, LOM 112 may affect utilization among LAG links associated with LAG 116 since the likelihood of packets being associated with a LAG link is related to the number of assignment values associated with a given path identifier.

In some embodiments, each of LOMs 112 and 114 may include functionality for determining how to assign or reassign associations between assignment values and path identifiers. In such embodiments, each of LOMs 112 and 114 may use various algorithms, predetermined information, dynamic information, and/or historical information when determining whether and/or how to assign or reassign associations between assignment values and path identifiers. For example, LOM 112 may determine that certain "popular" assignment values are attributable to a large percentage of utilization among LAG links and, as such, LOM 112 may attempt to assign each of these "popular" assignment values to a separate LAG link. In another example, LOM 114 may increase a number of assignment values that are associated with a path identifier after determining that a corresponding LAG link (e.g., with regard to path identifier) is underutilized. In another example, LOM 114 may decrease a number of assignment values that are associated with a path identifier after determining that a corresponding LAG is overutilized.

In some embodiments, each of LOMs 112 and 114 may be configured to maintain routing information and/or path related information based on newly received utilization information which may be used for new flows and may also be configured to store routing information and/or path related information based on older received utilization information which may be used for pre-existing flows. For example, assuming an assignment value '2' was reassigned to a path identifier 'X' from 'Y', if a flow associated with an assignment value '2' was initiated (e.g., existing) prior to the reassignment, subsequent packets associated with the flow may still be modified to include path identifier 'Y', while packets from all new flows associated with an assignment value '2' may be modified to include path related a path identifier 'X'. In this example, by maintaining information for existing flows, an existing flow need not be reassigned to a path identifier and, as such, packets for the flow may continue to traverse the same LAG link.

In some embodiments, each of LOMs 112 and 114 may be configured to maintain routing information and/or path related information based on newly received utilization information which may be used for new flows and pre-existing flows. In such embodiments, each of LOMs 112 and 114 may be configured to provide additional information when a flow is reassigned to another path identifier. For example, assuming an assignment value '2' was reassigned to a path identifier 'X' from 'Y', if a flow associated with an assignment value '2' was initiated (e.g., existing) prior to the reassignment, subsequent packets associated with the flow may be modified to include path identifier 'Y' regardless of a previous path identifier for the flow. In this example, one or more procedures (e.g., a handover operation) may be implemented such that the flow is processed and/or handled correctly, e.g., at a destination port or endpoint processor.

In some embodiments, network elements 104 and 106 may represent nodes (e.g., routers, switches, or other devices) associated with LAG 116. For example, network element 104 and 106 may be routers connected via multiple network connections collectively known as LAG 116. In this example, LAG ports 'A', 'B', 'C', and 'D' may each represent a LAG link or network connection associated with LAG 116.

In some embodiments, network elements 104 and 106 may include functionality for allocating packets or flows among LAG links (e.g., LAG ports 'A-D'). For example, network element 104 may be configured to analyze or inspect a path identifier in a received packet and to determine, using the path identifier, which LAG port (e.g., LAG link) to utilize when sending the packet. In this example, the path identifier may indicate a particular LAG link associated with LAG 116.

In some embodiments, network elements 104 and 106 may include routing information and/or path related information stored in one or more data structures. For example, routing information and/or path related information may include a port forwarding table, where each entry in the port forwarding table may include an association between a path identifier and a port indicator that indicates which LAG link a packet traverses. Using a port forwarding table or related information, network elements 104 and 106 may determine a LAG link to utilize for packets based on corresponding path identifiers included in the packets.

LAG controller 110 may represent any suitable entity or entities (e.g., one or more nodes or devices) for monitoring and/or controlling LAG link utilization. In some embodiments, LAG controller 110 may directly or indirectly monitor status information and/or aspects associated with LAG 116 or links therein. For example, LAG controller 110 may directly monitor performance, including link utilization, of links in LAG 116 by receiving information from network elements 104 and/or 106. In another example, LAG controller 110 may indirectly monitor performance, including link utilization, of links in LAG 116 by receiving information from network element 102, LOM 112, network element 108, and/or LOM 114. In this example, LAG controller 110 may not even need to communicate with network elements 104 and 106, thereby allowing network elements 104 and 106 to forgo needing additional functionality for communicating with LAG controller 110 (e.g., an SDN interface or related functionality).

In some embodiments, LAG controller 110 may communicate with various entities (e.g., network elements 102-108, network operators, or other sources) and may determine utilization rates or related information for LAG 116, a LAG link therein, or a related entity (e.g., a node, a resource, or a network segment). In another example, LAG controller 110 may determine whether a LAG or a link therein is overloaded, underloaded, experiencing problems, or operating normally.

In some embodiments, LAG controller 110 may be implemented as a distributed entity across multiple computing devices or platforms. For example, LAG controller 100 may be implemented as a software module executing on processors associated with LOM 112, LOM 114 and/or other entities, such as network elements 102-108.

In some embodiments, LAG controller 110 may communicate with one or more of network elements 102-108 or modules using a software defined network (SDN) related interface or another interface. Exemplary SDN related interfaces may include an OpenFlow protocol interface or a Diameter protocol interface.

In some embodiments, LAG controller 110 may use received or derived information to direct or trigger LAG link allocation and/or to modify routing or related information. For example, LAG controller 110 may receive utilization rates from network elements 104-106 connected to LAG 116. The utilization rates may indicate an amount that each LAG link is being utilized. In this example, LAG controller 110 may use this information to (re)distribute load among LAG links associated with LAG 116, e.g., by modifying values in a path assignment table at network element 102 or LOM 112. In another example, LAG controller 110 may receive and send LAG utilization related information to LOM 112 and LOM 112 may determine whether and/or how to (re)distribute load among LAG links associated with LAG 116.

It will be appreciated that FIG. 1 is for illustrative purposes and that various nodes and/or modules, locations, and/or functionality described above in relation to FIG. 1 may be changed, altered, added, or removed.

Figure 2A:
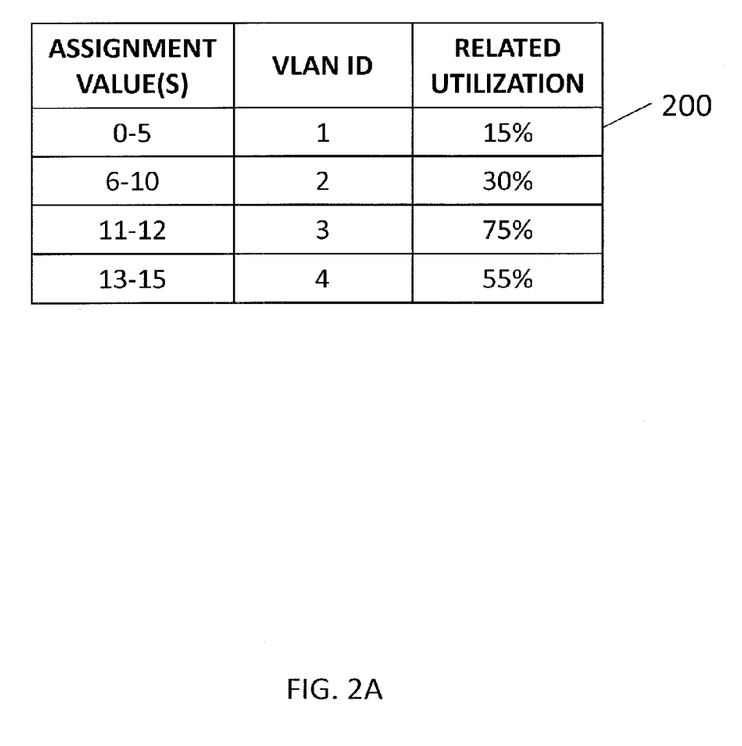
FIGS. 2A and 2B are diagrams illustrating exemplary data associated with LAG link allocation according to an embodiment of the subject matter described herein.
Figure 2B:
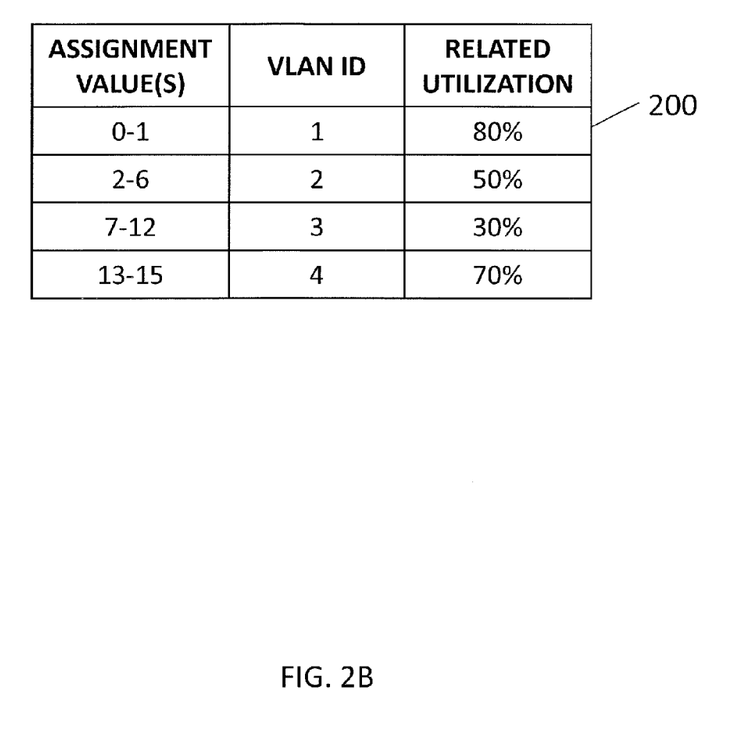

FIGS. 2A and 2B are diagrams illustrating exemplary data 200 associated with LAG link allocation according to an embodiment of the subject matter described herein. In some embodiments, data 200 may be accessed by network element 102, network element 108, LOM 112, LOM 114, LAG controller 110, and/or another entity. In some embodiments, data 200 may be stored using various data structures. In some embodiments, data 200 may include any suitable information for allocating or assigning path identifiers. Exemplary information for allocating or assigning path identifiers may include status information associated with a LAG, e.g., link utilization information, error related information, maintenance information, performance information, priority information, operator preference information, or user preference information.

Referring to FIG. 2A, data 200 may be depicted using a table representing associations between assignment values (e.g., a range of values between 0-15) and path identifiers (e.g., VLAN identifiers and/or MPLS labels). For example, as depicted in FIG. 2A, a VLAN identifier '1' may be associated with assignment values '0-5', a VLAN identifier '2' may be associated with assignment values '6-10', a VLAN identifier '3' may be associated with assignment values '11-12', and a VLAN identifier '4' may be associated with assignment values '13-15'.

In some embodiments, data 200 may also include information regarding link utilization associated with LAG 116, such as a current utilization rate associated with a LAG link that corresponds to a particular path identifier. For example, as depicted in FIG. 2A, VLAN identifier '1' may be associated with a relative link utilization rate of '15%' corresponding to LAG port 'A' illustrated in FIG. 1, VLAN identifier '2' may be associated with a relative link utilization rate of '30%' corresponding to LAG port 'B' illustrated in FIG. 1, VLAN identifier '3' may be associated with a relative link utilization rate of '75%' corresponding to LAG port 'C' illustrated in FIG. 1, and VLAN identifier '4' may be associated with a relative link utilization rate of '55%' corresponding to LAG port 'D' illustrated in FIG. 1. In some embodiments, data 200 may be modified, e.g., in response to obtaining and/or receiving utilization related information from LAG controller 110. For example, LAG controller 110 may obtain utilization rates associated with each LAG link periodically, e.g., every 30 seconds, and/or aperiodically (e.g., dynamically). In this example, LAG controller 110 may send this utilization information to LOM 112 and, in response, LOM 112 may modify data 200 in an effort to load balanced traffic among LAG links associated with LAG 116.

In some embodiments, assignment procedures (e.g., one or more techniques for assigning path related identifiers) may be modified and/or changed such that some path identifiers are assigned to more or less traffic. For example, if a path identifier is associated with an underutilized LAG link, data 200 may be modified to associate more assignment values with the path identifier. In this example, by associating more assignment values with the path identifier, a higher percentage of new flows may be allocated to the underutilized LAG link. In another example, if a path identifier is associated with an overutilized LAG link, data 200 may be modified to associate less assignment values with the path identifier. In this example, by associating less assignment values with the path identifier, a lower percentage of new flows may be allocated to the overutilized LAG link.

Referring to FIG. 2B, data 200 may be depicted after modifying associations between assignment values and path identifiers. For example, as depicted in FIG. 2B, VLAN identifier '1' may be associated with assignment values '0-1', VLAN identifier '2' may be associated with assignment values '2-6', VLAN identifier '3' may be associated with assignment values '7-12', and VLAN identifier '4' may be associated with assignment values '13-15'.

In some embodiments, data 200 may also include updated information regarding link utilization associated with LAG 116, such as current utilization rates. For example, as depicted in FIG. 2B, VLAN identifier '1' may be associated with a relative link utilization rate of '80%' corresponding to LAG port 'A' illustrated in FIG. 1, VLAN identifier '2' may be associated with a relative link utilization rate of '50%' corresponding to LAG port 'B' illustrated in FIG. 1, VLAN identifier '3' may be associated with a relative link utilization rate of '30%' corresponding to LAG port 'C' illustrated in FIG. 1, and VLAN identifier '4' may be associated with a relative link utilization rate of '70%' corresponding to LAG port 'D' illustrated in FIG. 1.

It will be appreciated that data 200 in FIGS. 2A and 2B is for illustrative purposes and that different and/or additional information may also be maintained for LAG link allocation.

Figure 3:
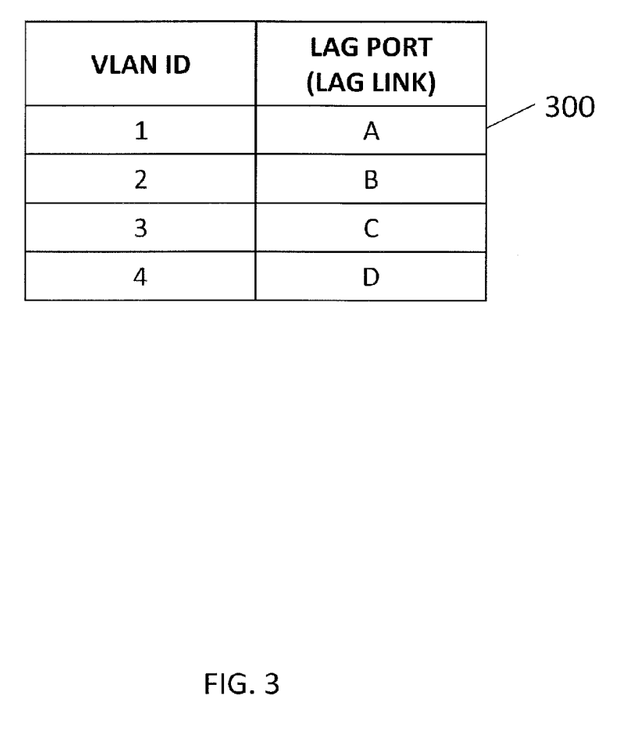
FIG. 3 is a diagram illustrating exemplary data indicating associations between virtual local area network (VLAN) identifiers and LAG links according to an embodiment of the subject matter described herein.

FIG. 3 is a diagram illustrating exemplary data 300 indicating associations between VLAN identifiers and LAG links according to an embodiment of the subject matter described herein. In some embodiments, data 300 may be accessed by network element 104, network element 106, and/or another entity and may be stored using various data structures. In some embodiments, data 300 may include any suitable information for allocating or assigning LAG links for one or more packets, such as VLAN identifiers, MPLS labels, path labels, and/or LAG ports associated with a LAG link. For example, network element 104 may receive a packet that includes a path identifier and may determine, using the path identifier and data 300, a corresponding LAG link or related LAG port associated with the path identifier.

In some embodiments, data 300 may be substantially static, thereby simplifying various data maintenance issues regarding such data. For example, in contrast to data 200, associations between path identifiers and LAG links may rarely change and, as such, related network elements (e.g., network elements 104-106) may not need to constantly modify these associations in data 300.

Referring to FIG. 3, data 300 may be depicted using a table representing associations between path identifiers and LAG ports (e.g., LAG links). In some embodiments, each path identifier may be associated with a particular LAG port or LAG link associated with LAG 116. For example, as depicted in FIG. 3, VLAN identifier '1' may be associated with LAG port 'A' illustrated in FIG. 1, VLAN identifier '2' may be associated with LAG port 'B' illustrated in FIG. 1, VLAN identifier '3' may be associated with LAG port 'C' illustrated in FIG. 1, and VLAN identifier '4' may be associated LAG port 'D' illustrated in FIG. 1. In this example, each LAG port represents a different LAG link associated with LAG 116.

In some embodiments, multiple path identifiers may be associated with a same LAG link. For example, data 300 may include VLAN identifiers '1-10', where at least two of the VLAN identifiers (e.g., VLAN identifiers '1-4') are associated with a same LAG link (e.g., LAG port 'A').

In some embodiments, each path identifier may be associated with a unique LAG link. For example, as depicted in FIG. 3, data 300 may include VLAN identifiers '1-4' and LAG ports 'A-D' in a one to one ratio, e.g., where each VLAN identifier is associated with a unique LAG port.

It will be appreciated that data 300 in FIG. 3 is for illustrative purposes and that different and/or additional information may also be maintained for LAG link allocation. For example, data 300 may include multiple or different path identifiers, such as VLAN identifiers and MLPS labels.

Figure 4:
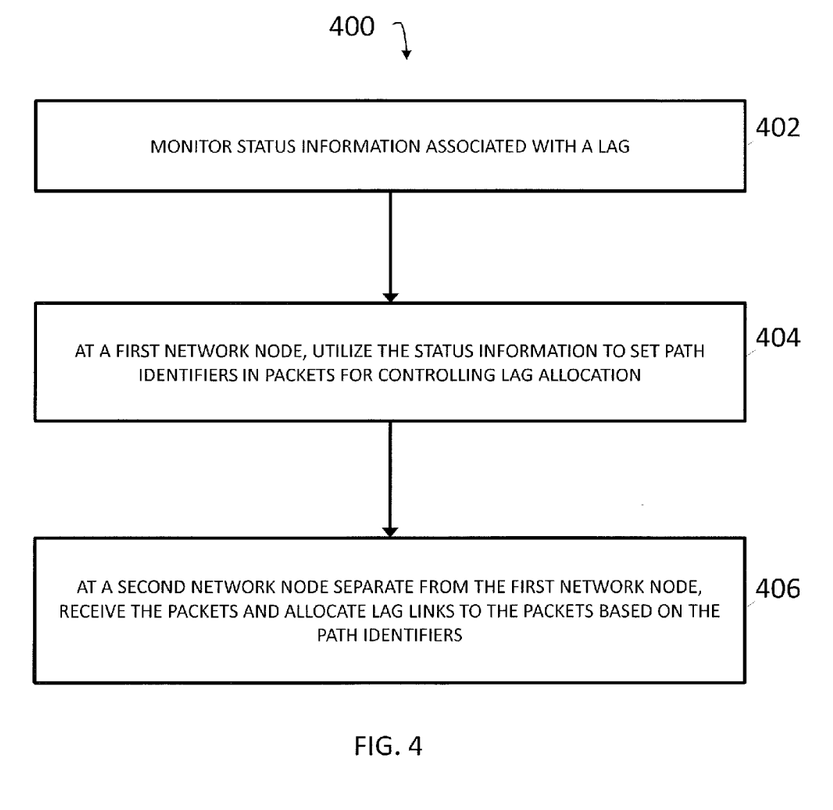
FIG. 4 is a diagram illustrating an exemplary process for indirect LAG link allocation according to an embodiment of the subject matter described herein.

FIG. 4 is a diagram illustrating an exemplary process for LAG link allocation according to an embodiment of the subject matter described herein. In some embodiments, exemplary process 400, or portions thereof, may be performed by or at network element 102, network element 104, network element 106, network element 108, LAG controller 110, LOM 112, LOM 114, and/or another node or module. For example, exemplary process, or portions thereof, may occur at a hypervisor or at a virtual machine associated with network 102 that sends traffic via network 100. In another example, exemplary process, or portions thereof, may occur at LAG controller 110 that sends traffic via network 100.

At step 402, status information associated with LAG 116 may be monitored. For example, link utilization information may be obtained by LAG controller 110 directly from network elements 104 and 106. In another example, link utilization information may obtained indirectly by LAG controller, e.g., via various other network nodes.

In some embodiments, status information associated with LAG 116 may include link utilization information, error related information, maintenance information, performance information, priority information, operator preference information, or user preference information In some embodiments, monitoring status information associated with LAG 116 may include receiving at least some of the status information using a SDN related protocol and/or interface, such as an OpenFlow protocol or a Diameter protocol.

In some embodiments, LOM 112 may be implemented at a network switch, a network router, a network device, a LAG controller, an endpoint, a hypervisor, a VM, or a server.

In some embodiments, link utilization information may include a bandwidth consumption value associated with LAG 116, a bandwidth availability value associated with LAG 116, or a utilization percentage or rate associated with LAG 116.

At step 404, a first network node may utilize the status information to set path identifiers in packets for controlling LAG allocation. For example, LOM 112 at network element 102 may determine new assignment values for one or more path identifiers based on performance information (e.g., error rates associated with particular links of LAG 116), user preferences, and/or link utilization information. In this example, LOM 112 may update a related hash table or other path assignment data structure (e.g., an associative array or CAM) with the new assignment values.

In some embodiments, a first network node (network element 102, network element 108, or LAG controller 110) may include a network switch, a network router, a network device, an endpoint, a hypervisor, a VM, or a server.

In some embodiments, path identifiers may include a VLAN identifier, a path label, or an MPLS label.

At step 404, a second network node separate from the first network node may receive the packets and allocate LAG links to the packets based on the path identifiers.

In some embodiments, a second network node (e.g., network element 104 or network element 106) may be connected to LAG 116.

In some embodiments, each LAG link associated with LAG 116 may correspond to one or more of the path identifiers.

In some embodiments, utilizing monitored link utilization to set path identifiers in packets for controlling LAG allocation may include selecting the path identifiers for the packets, including the path identifiers in the packets, and sending the packets. For example, LOM 112, network element 102 or a virtual element therein (e.g., a hypervisor or a VM) may select a path identifier for a packet based on an assignment value stored in a hash table, an associative array, or a CAM and the packet's header information. In this example, the packet may be modified to include the path identifier and sent to another node, e.g., network element 104.

In some embodiments, allocating LAG links to packets based on path identifiers may include determining, using the path identifiers and forwarding information, corresponding LAG links, and sending, via the corresponding LAG links, the packets. For example, network element 104 may receive a packet containing a VLAN identifier '2'. In this example, network element 104 may consult data 300 to determine that VLAN identifier '2' is associated with LAG port 'B' and, as such, may send the packet via LAG port 'B'.

It should be noted that LAG controller 110, LOM 112, LOM 114, and/or functionality described herein may constitute a special purpose computing device. Further, LAG controller 110, LOM 112, LOM 114, and/or functionality described herein can improve the technological field of routing and/or loading balancing communications and can improve LAG utilization and related LAG allocation techniques.

The subject matter described herein for LAG link allocation improves the functionality of LAGs and networks in general by providing for more efficient resource (e.g., link) utilization. It should also be noted that a computing platform that implements the subject matter described herein may comprise a special purpose computing device usable to monitor status information associated with a LAG and to use this information in adjusting LAG link allocations.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for indirect link aggregation group (LAG) link allocation, the method comprising:
   at a LAG controller, indirectly monitoring status information associated with a LAG by receiving the status information from a first network node that is indirectly connected to the LAG via a second network node;
   at the first network node, utilizing the status information to set path identifiers in packets for controlling LAG allocation, wherein utilizing the status information includes receiving, from the LAG controller, path assignment information indicating how path identifiers are to be assigned to packets, wherein utilizing the status information to set path identifiers in packets for controlling LAG allocation includes selecting the path identifiers for the packets, including the path identifiers in the packets, and sending the packets; and at the second network node separate from the first network node, receiving the packets and allocating LAG links to the packets based on the path identifiers, wherein the second network node is connected to the LAG.

2. The method of claim 1 wherein the status information associated with the LAG includes link utilization information, error related information, maintenance information, performance information, priority information, operator preference information, or user preference information.

3. The method of claim 1 wherein allocating LAG links to the packets based on the path identifiers includes determining, using the path identifiers and forwarding information, corresponding LAG links, and sending, via the corresponding LAG links, the packets.

4. The method of claim 1 wherein monitoring the status information associated with the LAG includes receiving at least some of the status information using a software defined network (SDN) related protocol.

5. The method of claim 2 wherein the link utilization information includes a bandwidth consumption value associated with the LAG, a bandwidth availability value associated with the LAG, or a utilization percentage or rate associated with the LAG.

6. The method of claim 1 wherein the first network node includes a network switch, a network router, a network device, the LAG controller, an endpoint, a hypervisor, a virtual machine (VM), or a server.

7. The method of claim 1 wherein the path identifiers includes a virtual local area network (VLAN) identifier, a path label, or a multiprotocol label switching (MPLS) label.

8. The method of claim 1 wherein each LAG link corresponds to one or more of the path identifiers.

9. A system for indirect link aggregation group (LAG) link allocation, the system comprising:

a LAG controller configured to indirectly monitor status information associated with a LAG by receiving the status information from a first network node that is indirectly connected to the LAG via a second network node;

the first network node configured to utilize the status information to set path identifiers in packets for controlling LAG allocation, wherein utilizing the status information includes receiving, from the LAG controller, path assignment information indicating how path identifiers are to be assigned to packets, wherein utilizing the status information to set path identifiers in packets for controlling LAG allocation includes selecting the path identifiers for the packets, including the path identifiers in the packets, and sending the packets; and the second network node separate from the first network node, wherein the second network node is configured to receive the packets and to allocate LAG links to the packets based on the path identifiers, wherein the second network node is connected to the LAG.

10. The system of claim 9 wherein the status information associated with the LAG includes link utilization information, error related information, maintenance information, performance information, priority information, operator preference information, or user preference information.

11. The system of claim 10 wherein the second network node is configured to determine, using the path identifiers and forwarding information, corresponding LAG links, and to send, via the corresponding LAG links, the packets.

12. The system of claim 9 wherein the LAG controller is configured to receive at least some of the status information using a software defined network (SDN) related protocol.

13. The system of claim 10 wherein the link utilization information includes a bandwidth consumption value associated with the LAG, a bandwidth availability associated with the LAG, or a utilization percentage or rate associated with the LAG.

14. The system of claim 9 wherein the first network node is implemented at a network switch, a network router, a network device, the LAG controller, an endpoint, a hypervisor, a virtual machine (VM), or a server.

15. The system of claim 9 wherein the path identifiers includes a virtual local area network (VLAN) identifier, a path label, or a multiprotocol label switching (MPLS) label.

16. The system of claim 9 wherein each LAG link corresponds to one or more of the path identifiers.

17. A non-transitory computer readable medium comprising computer executable instructions embodied in the non-transitory computer readable medium that when executed by at least one processor perform steps comprising:

at a LAG controller, indirectly monitoring status information associated with a LAG by receiving the status information from a first network node that is indirectly connected to the LAG via a second network node;

at the first network node, utilizing the status information to set path identifiers in packets for controlling LAG allocation, wherein utilizing the status information includes receiving, from the LAG controller, path assignment information indicating how path identifiers are to be assigned to packets, wherein utilizing the status information to set path identifiers in packets for controlling LAG allocation includes selecting the path identifiers for the packets, including the path identifiers in the packets, and sending the packets; and at the second network node separate from the first network node, receiving the packets and allocating LAG links to the packets based on the path identifiers, wherein the second network node is connected to the LAG.

* * * * *